Aug. 25, 1959   B. LONG   2,900,764
MANUFACTURE OF GLASS
Filed Nov. 7, 1955   3 Sheets-Sheet 1
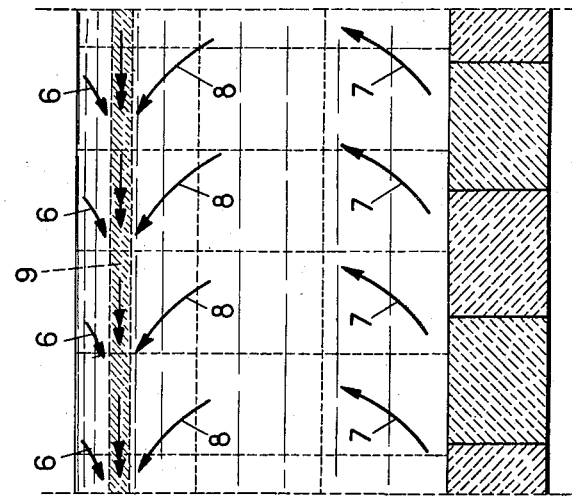
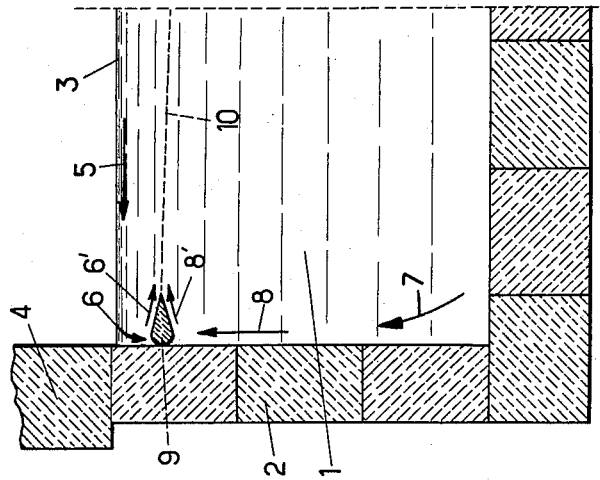
INVENTOR
Bernard Long
By Holcombe, Wetherill & Brisebois
ATTORNEYS Aug. 25, 1959

B. LONG 2,900,764

MANUFACTURE OF GLASS

Filed Nov. 7, 1955

INVENTOR
Bernard Long
By Holcombe, Wetherill & Brisebois
ATTORNEYS

Aug. 25, 1959     B. LONG     2,900,764
MANUFACTURE OF GLASS
Filed Nov. 7, 1955     3 Sheets-Sheet 3
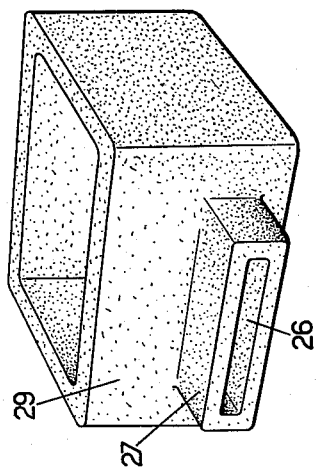
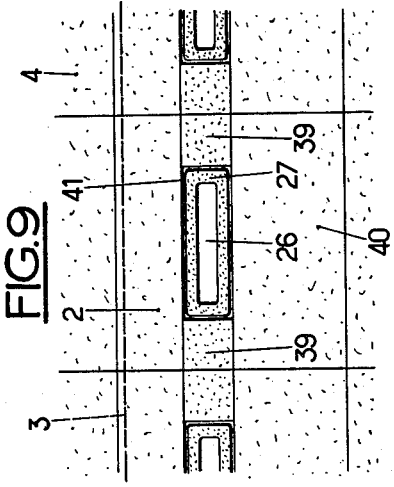
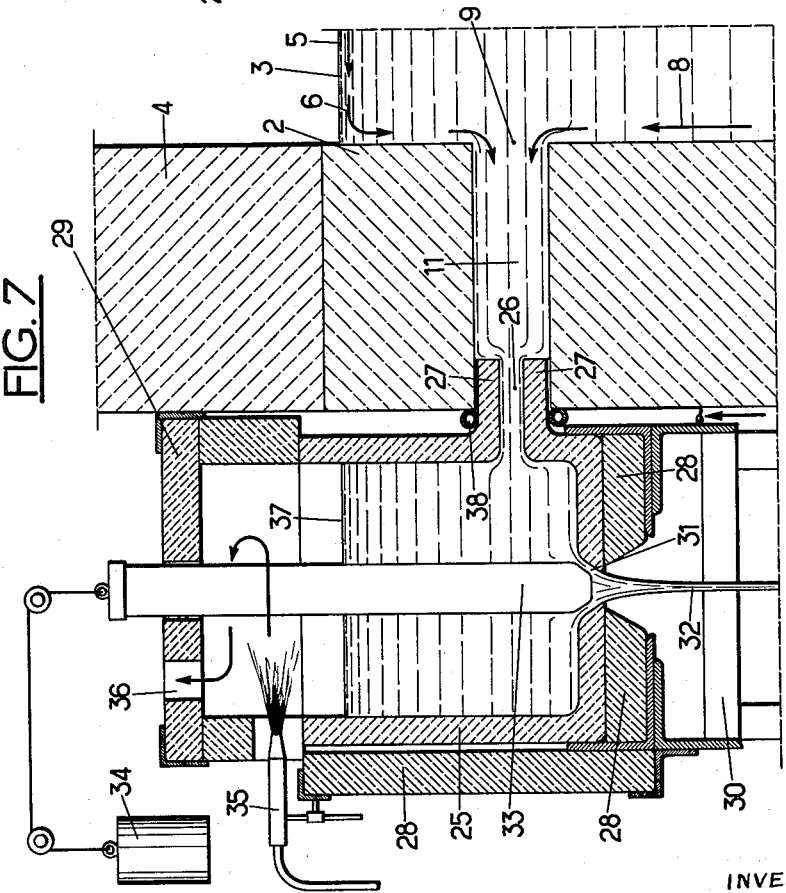
INVENTOR
Bernard Long
ATTORNEY United States Patent Office 2,900,764
Patented Aug. 25, 1959

2,900,764

MANUFACTURE OF GLASS

Bernard Long, Paris, France, assignor to Compagnies Reunies des Glaces & Verres Speciaux du Nord de la France, Paris, France, a corporation of France Application November 7, 1955, Serial No. 545,492

Claims priority, application France November 13, 1954

5 Claims. (Cl. 49—54)

My invention relates to the continuous manufacture of glass in tank furnaces, and particularly to a method and apparatus which permits the elimination of the bubbles which are generally introduced into the glass after it has been fined, as a result of its contact with the refractory materials which form the walls of the tank while it is being thermally conditioned for working.

It is well known that at the end of the fining step the glass is at too high a temperature, that is to say has too low a viscosity, to be capable of being properly worked by machines. In the course of the cooling process called "thermal conditioning" which it must necessarily undergo in order to become suitable for working, the refractory materials against which it washes give rise to bubbles which are more especially undesirable as the previous fining has been more severe.

The problem of the bubbles caused by the refractory materials after fining assumes particular importance in connection with the manufacture of drawn glass, since thermal conditioning necessitates, in actual practice, a particularly lengthy contact with the refractory materials.

It has heretofore been considered that the problem of the bubbles which occur into the glass between the fining compartment and the drawing compartment must be solved by the use of properly selected refractory materials, but since the various causes of formation of the bubbles in the zone of contact between the glass and the refractory material are still poorly understood, it is difficult, if not impossible, to determine the criterions which must be employed in the judicious selection of the refractory materials. The actual tendency is to employ in the thermal conditioning chamber materials which offer substantial insurance of resistance to corrosion, when employed in the melting compartment, but numerous examples prove that these materials are capable of causing as many, if not more, bubbles than refractory materials less resistant to corrosion.

It will thus be seen that the choice of refractory materials, as now actually practiced, does not in itself solve the problem of the bubbles in a satisfactory manner.

It is, therefore, the object of my invention to reduce the aforementioned inconveniences by applying a new and radical solution to the problem of bubbles caused by refractory materials during the thermal conditioning of glass and which may be found in the glass products hot formed by the machines. According to my invention, the fraction of the glass having bubbles is eliminated as they occur, and they are thus prevented from being scattered through the bulk of fined glass which is brought to the machines.

It is well known, that in the thermal conditioning compartment of a tank furnace, the glass at the surface of the bath moves transversely from the axial zone of the bath toward its lateral walls and then, after having come into contact therewith, this surface glass descends along the lateral walls.

Heretofore, it has been generally admitted without proof that this downward flow along the lateral walls necessarily extended to the bottom of the bath.

By conceding that this downward flow extended so far and admitting its existence for all types of glass as well as for all types of furnaces, a true understanding of the problem of bubbles due to refractory materials has been seriously delayed and consequently its solution has also been delayed.

The present applicant has discovered that in the compartments in which clear glasses are thermally conditioned (such as plate glass, window glass, bottle glass, etc.), which contain very wide and very deep baths of glass, there is, beginning at the bottom, a vertical current ascending along the lateral walls when these walls are, as is the usual case, composed of refractory materials which readily absorb the infra red radiations near the visible spectrum.

This ascending current, the existence of which has been established by the present applicant, opposes the aforementioned descending current, which extends only a relatively short distance below the surface and not to the bottom of the bath as has heretofore been believed.

The meeting of these two currents, one ascending and one descending, has the effect of creating in contact with the lateral walls a relatively calm zone of glass in which all the bubbles caused by the refractory materials come to rest, since the two currents in question sweep completely over the surface washed by the glass.

In all furnaces for making clear glass which have lateral walls made of a silico-aluminous refractory material containing a certain percentage of highly absorbent impurities (notably iron oxides or even carbides and silicides in the case of electro-cast materials having a mullite or corundum base), the above mentioned calm zone is encountered at a depth (below the surface of the bath) somewhere between about 15 and about 25 centimeters, this depth decreasing as the glass cools and the total depth of the bath diminishes.

The present applicant has also established that this calm zone is found at the level of the region in which the highest temperature in the bath exists at a certain depth below the surface of the bath, which permits the location of this zone as will be hereinafter explained.

The calm zone evidently exists all along the lateral walls from the end of the fining section to the working compartment. As the result of a transverse temperature gradient, streaks of bubbly glass detach themselves from this zone and enter into the fined glass, but the greater part of the bubbly glass in this calm zone follows the longitudinal temperature gradient and flows slowly towards the working chamber, while remaining in contact with the walls.

It should be emphasized that the bubbly glass of the calm zone results from the sweeping of the lateral walls by both the ascending and the descending currents already mentioned. This glass contains not only bubbles but also in solution a by no means negligible quantity of refractory materials which have the effect of considerably increasing its viscosity. As it moves along the walls it can only continue to dissolve the refractory materials and this leads to substantial defects of homogeneity in the manufactured products, especially in glass drawn from the free surface of a glass bath, in which glass these defects manifest themselves in the form of marginal lines or streaks.

The process which constitutes the subject matter of this invention consists essentially of removing in a continuous and uniform manner a small, regulable quantity of glass from the neighborhood of the lateral walls which hold the glass bath during its thermal conditioning, this removal being performed at the level of the calm zone existing below the surface of the bath where the descending and ascending currents which contain the bubbles caused by the refractory materials meet. The glass thus removed is undesirable because of the bubbles which it contains and also by reason of its greater viscosity which is a consequence of the dissolution therein of a small quantity of the refractory material.

According to the present invention, this withdrawal is preferably effectuated by utilizing the method which consists in permitting a small regulable flow of undesirable glass to run out in a continuous manner through openings in the lateral walls.

These small streams of glass are suitably spaced between the end of the fining compartment and the working compartment and constitute a genuine "drainage" of the bubbles caused by the refractory materials. They eliminate at the same time the most viscous glass which has swept along the refractory materials and which causes the most marked defects in the homogeneity of the finished products.

These diversions of glass towards the exterior of the furnace have the effect of stopping the streaks which the slight transverse thermal gradient draws from the inside of the calm zone from entering into the mass of fined glass, as has already been pointed out.

On the other hand, the radius of the effect of these diversions on the bubbly glass which moves longitudinally along the walls is large enough because the flow takes place under an appreciable pressure.

The apparatus which embodies my invention is characterized by the fact that openings are provided in the lateral walls of the thermal conditioning chamber at the level of the calm zone below the surface of the bath where meet the ascending and descending currents containing the bubbles caused by the refractory materials, through which openings a slight and regulable flow of glass is permitted to run to the exterior of the furnace in a continuous manner.

As a consequence of the foregoing considerations the number of openings on each side need not be large, in order to draw out all the glass which has swept along the surface of the refractory materials. It may suffice, for example, to provide a single opening in each side wall block of the usual dimensions.

Obviously, the flow of bubbly glass running out through each opening cannot be very large, since the ascending and descending currents which collect the bubbles are very slow and consequently have small volumes of flow. As a matter of fact, the total quantity of bubbly glass evacuated from the furnace by all of the openings provided in accordance with the invention represents only a very small percentage of the glass worked by the machines; it therefore results in only a very small loss of glass.

The outlets provided in the lateral walls of the thermal conditioning compartment for the glass may be of various types and dimensions. They may simply consist of cylindrical canals cut through the side wall blocks. Each canal is then provided, on the side towards the exterior of the furnace, with a cylindrical refractory plug of a certain length which may be locked in place and which is axially pierced by an orifice of variable diameter. The refractory plug may be heated by burners acting on the portion which is outside the lateral wall. There are thus three factors controlling the flow: the diameter of the orifice in the plug, the length of the plug outside the wall, and the surface temperature of the plug.

In one specific embodiment of my invention, these openings may take the form of slots opening into a certain stretch of the calm zone. The stream of bubbly glass which then flows from the furnace through one of these slots is received by a heat-insulated receptacle or container beside the lateral wall, the bottom of which is provided with an orifice through which the glass runs vertically, this orifice cooperating with a vertical plug or plunger which is adapted to vary the effective diameter of the orifice through which the glass runs out of the receptacle. The regulation of the dimensions of the outlet and the adjustment of the auxiliary means for heating the glass in the receptacle permits the flow of bubbly glass which leaves the receptacle, and consequently the thermal conditioning compartment, to be very flexibly regulated.

The openings in the thermal conditioning compartment are positioned at a level which is dependent upon the position of the calm zone as determined by previous studies of furnaces of the same type. For a given clear glass, this level varies substantially with the temperature and depth of the bath. It should be noted, however, that the calm zone extends through a certain vertical distance in the bath and that it is therefore unnecessary to determine the proper level for the openings with too great a precision.

The process constituting my invention may be applied to tank furnaces in which clear glass is melted, but it is of particular value in the case of drawing, for the glass is then led to machines at rather low temperatures (about 1000° C.), which necessitates a long thermal conditioning compartment and, consequently, a prolonged contact between the glass and the refractory materials.

All of the drawing methods presently known (Fourcault, Libby-Owens, Pittsburgh) suffer in varying degrees from difficulties arising from the bubbles caused by the refractory materials. The process constituting the present invention brings to these processes not merely an improvement in the quality of the glass, but a saving in the cost of construction, since it permits the employment, in the thermal conditioning compartment, of ordinary refractory materials instead of the extremely expensive electro-cast refractories which are far from being completely satisfactory.

In order that the invention may be better understood, the description of the events which take place in the thermal conditioning compartment, as ascertained by applicant and which are basic to the invention, will be illustrated by two figures. I will then describe, purely by way of example, certain particular means for carrying out the invention which are illustrated in the other figures on the attached drawings, in which:

Figure 1 is a transverse cross-section showing part of the thermal conditioning compartment of a tank furnace;

Figure 2 is an elevational view taken from the inside of the furnace, of one of the lateral walls of this thermal conditioning compartment;

Figure 7 is a cross-sectional view of a third embodiment of the invention comprising an auxiliary receptacle designed to receive the bubbly glass as it passes through the lateral wall in a canal consisting of a slot formed by cutting out the major part of a side wall block and delivered to a point outside the furnace;

Figure 8 is a perspective view showing the auxiliary receptacle of Figure 7 on a reduced scale; and Figure 9 shows the outlet for the bubbly glass as seen from the inside of the glass bath.

Figure 5:
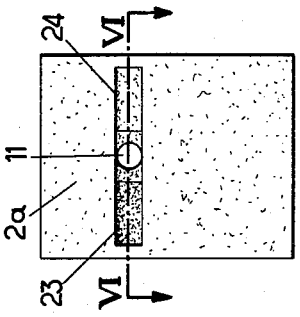
Figures 5 and 6 are, respectively, an elevation and a cross-section along the line VI—VI of Figure 5, of a special side wall block provided with a cylindrical canal which has a widened mouth at the bath end in order to facilitate the admission or capture of the bubbly glass in accordance with a second embodiment of the invention.

As shown in Figures 1 and 2, the bath of glass in the thermal conditioning compartment 1 is confined by the lateral wall 2 on which rests the wall of the superstructure 4.

The level of the surface of the bath is indicated by the horizontal line 3. The level is substantially constant in conventional glass furnaces.

The transverse movement of the surface glass follows the line of the arrow 5 and continues as the descending current indicated by the arrow 6.

Movement of the glass coming from the neighborhood of the bottom is indicated by the arrow 7 and continues as the ascending current indicated by the arrow 8.

The currents 6 and 8 meet in the calm zone 9 which is cross-hatched. This zone lies substantially at the level of the layer 10 of highest temperature, indicated by the broken line which departs relatively slightly from a horizontal plane and which may be easily located when the temperature in the glass bath is measured along vertical lines beginning at its surface.

The arrows 6' and 8' represent residual currents which draw the bubbly glass towards the axial zone of the bath in a conventional thermal conditioning compartment.

Figure 2 shows particularly well by means of arrows 6 the direction of the streaks of glass which sink below the surface of the bath after they have encountered the lateral wall 2, and by means of arrows 8 the directions of the streaks of glass which rise along this lateral wall at the moment at which they are about to fuse with the streaks 6 in the calm or quiet zone. 9.

The arrows 7 are curved with their concave side turned towards the top, whereas the arrows 8 which are continuations there of have their concave sides turned towards the bottom. These two orientations of the streaks of glass which rise along the vertical wall are the natural consequence of the fact that the ascending movement of the glass merges with its longitudinal movement.

Beginning at the surface and down to a certain depth, the longitudinal movement proceeds from the fining compartment towards the working compartment, whereas in the lower layers it proceeds in the opposite direction.

It is evident that in the "calm" zone 9, the bubbly glass moves longitudinally in contact with the lateral wall 2 towards the working compartment as indicated by the double headed arrows in Fig. 2.

As has already been pointed out, the calm zone is situated at a modern depth below the surface of the bath which, for a given glass, varies slightly with the temperature and with the depth of the bath.

For the glass to be drawn into sheets, its usual depth is in the neighborhood of 20 centimeters at the beginning of the thermal conditioning compartment when the bath is between 120 and 150 centimeters deep. When this depth is is no more than 60 to 80 centimeters, the usual depth of the calm zone is about 15 centimeters.

These figures are only approximate since it is certain that an important factor affecting the depth of the calm zone is the extent of the heat loss to the superstructure of the thermal conditioning compartment, a loss which may vary substantially between one type of furnace and another.

Figure 4:
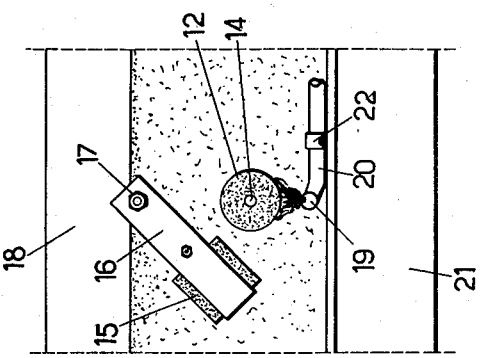
Figure 4 is an elevational view taken from outside the furnace of a block in the lateral wall, the hollow plug in the cylindrical opening, and the means for closing it swung to one side of its normal position in this first embodiment.
Figure 3:
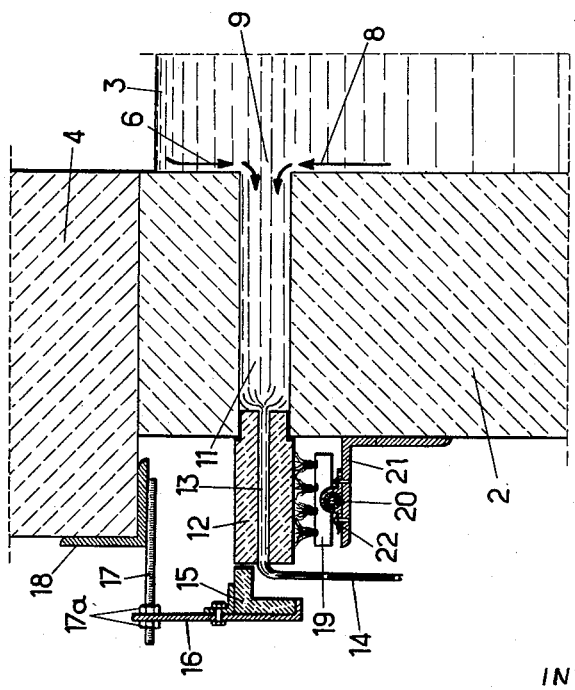
Figure 3 is a cross-section taken on a plane perpendicular to the lateral wall through a cylindrical opening in the lateral wall which permits the egress of the bubbly glass, equipped with its plug, as in the first embodiment of the invention.

On Figures 3 and 4, which illustrate one embodiment of my invention, the outlet through the lateral wall 2 consists of a cylindrical canal 11 provided in the wall 2 and closed by a plug 12 made of a refractory material and pierced by an axial orifice 13. After having passed through this orifice, the bubbly glass falls outside the furnace in the form of a streamlet 14.

The plug 12 is held clamped against the lateral wall by a refractory member 15 carried by a metallic plate 16 which is rotatably mounted on a threaded rod 17 and which may be fixed in place thereon by means of two nuts 17a. The threaded rod 17 is soldered to one of the corner members 18 which support the wall of the superstructure 4.

The refractory member 15 serves not only as a shoulder for the plug 12 to hold it against the lateral wall, but also to prevent the glass which runs out through the orifice 13 from being too greatly cooled by radiation.

A gas heating range 19 may be used to prevent the glass from hardening too much as it passes through the orifice 13 of the plug 12. The range is fed by a tube 20 fixed to a corner member 21 by a band 22.

When the bubbly glass runs out, the descending current 6 and the ascending current 8 are consequently deviated and drawn into the cylindrical canal 11. If the flow is sufficiently great, the bubbly glass is no longer drawn towards the middle of the furnace in the direction indicated by the arrows 6' and 8' (Fig. 1) and the calm zone 9 no longer extends in that direction; there is then no further mixing of bubbly glass with fined glass.

While the drawings appear to indicate that a drainage canal 11 should be provided in each side wall block of the thermal conditioning compartment, and if this arrangement is suitable for the beginning of this compartment, it is sufficient to provide one out of every two or three side wall blocks near the end thereof with such a canal.

Figure 4 shows the locking member 15 ready to be brought down into its vertical position and held against the plug 12 by means of the nuts 17a carried by the threaded rod 17.

Figure 6:
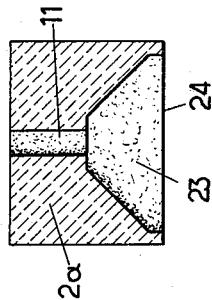

Figures 5 and 6 show a side wall block 2a (forming part of a lateral wall 2) provided with an outlet pipe for the bubbly glass which has a special shape. Near the middle of the block 2a, the cylindrical canal 11 opens into a wide mouth 23 which facilitates the drawing in of the glass since it terminates in a rectangular opening 24 which is nearly as large as the block itself.

It will be easily seen that if all of the side wall blocks of the thermal conditioning compartment are of the 2a type, the bubbly glass will be completely eliminated.

Figures 7, 8 and 9 show a third embodiment of the invention.

On Figure 7 it will be seen that the glass of the calm zone 9 which has passed through the rectangular canal 11 enters a receptacle 25, made of a silico-aluminous refractory, through a slot 26 provided between the lips 27 of the receptacle 25 which project into the canal 11.

The receptacle 25 is surrounded by an insulating jacket 28 and closed at its top by a refractory cover 29. The assembly consisting of the receptacle 25, the insulating jacket 28 and the cover 29 is carried by a metallic support 30.

The bubbly glass which has entered the recipient 25 through the slot 26 runs out through a circular orifice 31 in the bottom of the receptacle 25 and the jacket 28 in the form of a small stream 32, the rate of flow of which may be regulated by the rise and fall of a plunger 33 made of a refractory material, the weight of the plunger being balanced by a counterweight 34.

A burner 35, from which the burned gases are evacuated through an opening 36 in the cover 29, permits the surface 37 of the glass in the receptacle 25 to be heated, if necessary.

When the plunger 33 completely blocks the outlet 31, the free surface 37 of the glass in the receptacle 25 is obviously at the same level as the free surface 3 of the glass in the furnace.

In order to prevent any possible leakage of glass from taking place between the inner walls of the canal 11 and the outer walls of the lips 27, the base of the lips may be encircled by a ring 38 made from a metallic tube through which water may be circulated.

On Figure 8, which is a perspective view showing the intermediate receptacle 25, the entry slot 26 for the bubbly glass may be seen, while Figure 9 shows the opening through which the bubbly glass runs out from the thermal conditioning zone and which consists of a rectangular slot 41 formed by placing the refractory block 2 on two refractory bars 39 which rest on another refractory block 40.

The invention is not restricted to the specific illustrated embodiment, but is subject to modifications and adaptations which will occur to those skilled in the art, and it should be understood that protection is sought for the invention as covered by the spirit and the language of the attached claims.

I claim:

1. The method of eliminating bubbles which are introduced into a body of molten glass after it has been fined, when it is led through the thermal conditioning compartment of a glass furnace to its working compartment, which method comprises the step of permanently removing small quantities of glass from said body near the lateral walls which contain the glass during its thermal conditioning, said small quantities being withdrawn at the level at which the temperature of the glass on each vertical line of the thermal conditioning compartment is the highest, which level is located at a certain depth below the surface of the bath.

2. The method claimed in claim 1 wherein the small amounts of glass are withdrawn from the thermal conditioning compartment at a level comprised between about 15 and about 25 centimeters below that of the surface of the glass bath in said compartment.

3. Apparatus for delivering substantially bubble-free molten glass to the working compartment of a glass furnace which comprises a thermal conditioning compartment through which said glass flows, en route towards said working compartment, said conditioning compartment being provided with lateral outer walls having longitudinally spaced canals therethrough, said canals being positioned at a level comprised between about 15 and about 25 centimeters below that of the surface of the glass bath in said compartment, said apparatus being provided with means for regulating the flow of glass through said canals.

4. Apparatus as claimed in claim 3 in which said canals lead to hollow plugs, said apparatus being provided with heating means for heating said hollow plugs to vary the viscosity of the glass passing therethrough and consequently regulate the rate of the flow therein.

5. Apparatus as claimed in claim 3, in which said flow regulating means comprises receptacles into which said canals lead and the walls of which extend upwardly to a height greater than that of the surface of the glass in the conditioning compartment, said receptacles being provided with an outlet below the level of said canals and means for varying the effective diameter of said outlet.

References Cited in the file of this patent

UNITED STATES PATENTS

| | | |
|---|---|---|
| 1,538,215 | Reece | May 19, 1925 |
| 1,538,229 | Weaver | May 19, 1925 |
| 1,810,911 | Ferngren | June 23, 1931 |
| 1,872,477 | Mambourg | Aug. 16, 1932 |
| 2,050,211 | Honiss | Aug. 6, 1936 |
| 2,363,954 | Gaunder | Nov. 28, 1944 |